Figure 1:
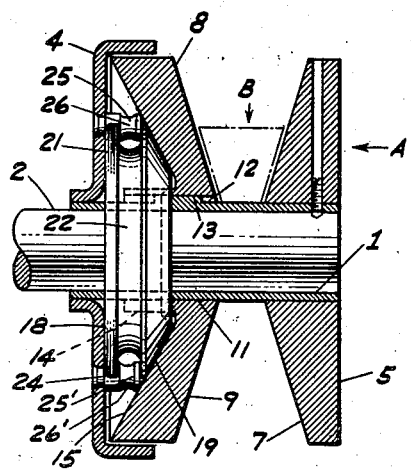

Sept. 30, 1952  M. H. DAVIS  2,612,054
V GROOVE PULLEY CENTRIFUGAL CLUTCH
Filed June 15, 1949  2 SHEETS—SHEET 1

Inventor
MARION H. DAVIS

By Arthur Robert
Attorney

Sept. 30, 1952  M. H. DAVIS  2,612,054
V GROOVE PULLEY CENTRIFUGAL CLUTCH
Filed June 15, 1949  2 SHEETS—SHEET 2

Inventor
MARION H. DAVIS
By Arthur Robert
Attorney

Patented Sept. 30, 1952

2,612,054

UNITED STATES PATENT OFFICE 2,612,054

V GROOVE PULLEY CENTRIFUGAL CLUTCH

Marion H. Davis, Hagerstown, Ind.

Application June 15, 1949, Serial No. 99,185

14 Claims. (Cl. 74—230.17)

This invention relates to a V groove pulley of the type made up of separate relatively movable sections and movable toward each other by centrifugally actuated wedge members. Such devices provide a simple and inexpensive clutch for a V belt, and when provided with a deep groove, incorporate an automatically variable drive ratio.

In the apparatus disclosed in my application for patent, Serial No. 2,451, filed January 15, 1948, three centrifugal wedges are bound together by a circumscribing spring, and in going from idling to maximum operating position, the stretching of the spring is substantially proportional to the circumferences at idling and maximum operating positions. As these devices are particularly suitable for small installations, under such conditions the percentage stretching of the spring becomes large. For example, the stretch from a 1½ inch diameter circle to a 2½ inch diameter circle amounts to 66⅔ per cent increase in circumference, and this stretch is superposed on the initial bias of the spring required to hold the wedges at their central inoperative position. As a result, the spring may become stretched beyond its elastic limit or become fatigued, and lose part of its restoring force or initial bias. This changes the engaging speed of the clutch and its other characteristics.

A further difficulty sometimes encountered in a three wedge clutch is that occasionally one of the wedges become lodged or stuck in expanded position. This apparently is because the wedges do not always arrange themselves symmetrically in expanded position so that when they move toward their central position they sometimes have become turned about 90° and become stuck. This is especially liable to happen when the spring becomes fatigued. Also, their unsymmetrical position causes vibration and excessive wear. The use of guides not only increases the cost of construction of the device, but introduces additional wearing surfaces and increases the liability of sticking at such surfaces. Also, fixedly attaching the wedges to the spring merely aggravates the stretching of the spring, because this does not prevent the wedges from arranging themselves unsymmetrically in expanded position, and uneven stretching of the spring results.

Accordingly among the objects of this invention is the provision of a combined centrifugal clutch and variable ratio transmission member which is more positive and certain in its action, has increased durability, and which retains its operating characteristics substantially unchanged over a long period of use.

A further object of the invention is the provision of a combined centrifugal clutch and variable ratio drive having a manual operator for the clutch.

Another object is the provision with such manual operator, of an automatic device to restore the manual operator to inoperative position.

According to one feature of the present invention, I employ only two substantially semicircular centrifugal dogs or wedges confined by a circumscribing spring, and I anchor the spring at the locations between the dogs. This results in a number of benefits. By employing only two dogs or wedges, the stretching of the spring in going from collapsed to expanded position is greatly reduced, because the stretching now becomes substantially proportional to the difference in diameters. Thus, for example, in going from a 1½ inch diameter circle a 2½ inch major axis ellipse, the spring stretches about 43 per cent compared to 66⅔ per cent in the example explained above. Furthermore, the increased length or diameter of each wedge across its mating face, precludes the wedge becoming displaced from proper operating position, or becoming lodged or stuck. With two semicircular wedges unsymmetrical disposition of the wedges in expanded position results in less unbalance, and less wobbling of the movable pulley section. The anchoring of the spring also assists in preventing sticking of the wedges and limits the unsymmetrical disposition of the wedges in expanded position, without producing excessive stretching of the spring. The device, therefore, retains substantially constant characteristics throughout its life.

A further feature of the invention resides in the provision of a manually operated device for expanding the wedges to cause driving engagement of the pulleys with the V belt. This is of particular value on a motor operated bicycle in which it is desired to crank the motor by pedalling the bicycle. The manual device may be arranged to be manually disengaged, but preferably provides automatic disengagement which may be accomplished by centrifugal force.

The improvements above described are of particular value in a combined clutch and variable ratio drive. However, they may be employed in a clutch device in which the effective depth of the V groove of the pulley is substantially the same as the thickness of the V belt, so that the variable ratio drive range is absent or is negligible.

Figure 2:
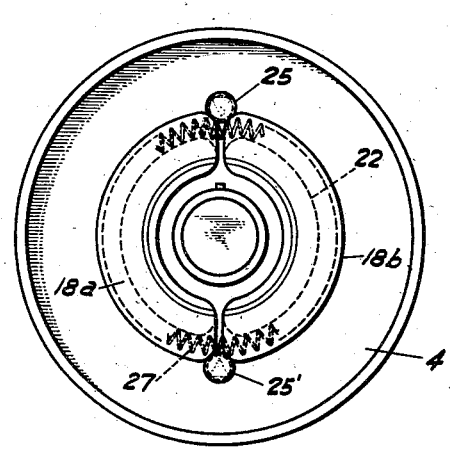
Figure 3:
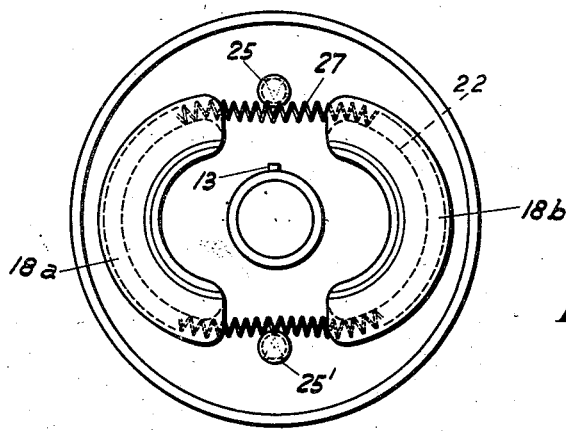
Figure 4:
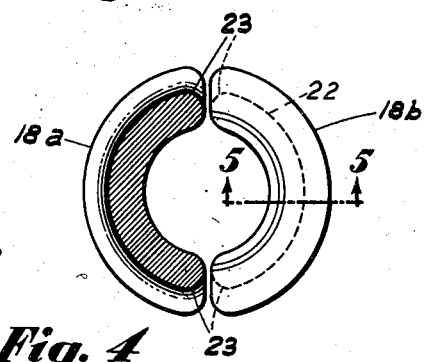
Figure 5:
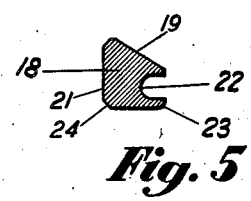
Figure 6:
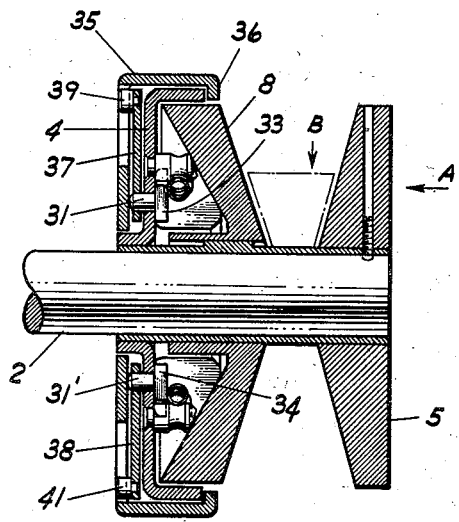
Figure 7:
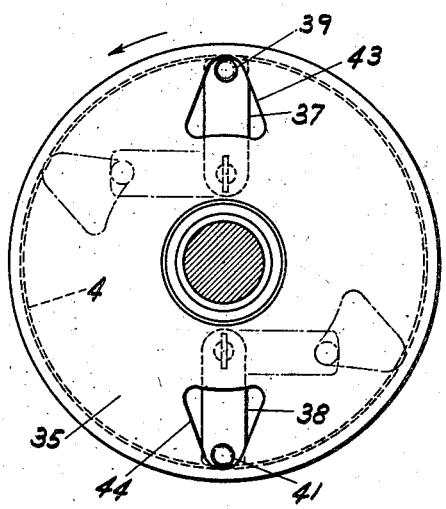
Figure 8:
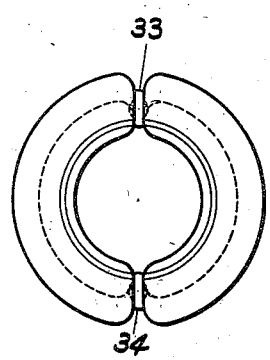
Figure 9:
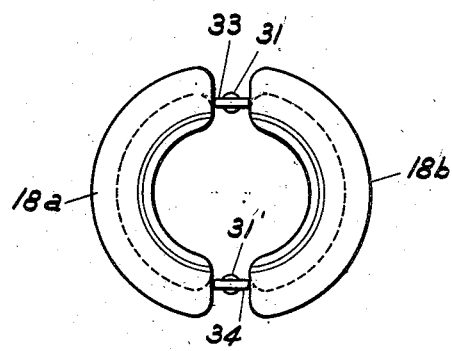

The invention will be described in greater detail in connection with the accompanying drawings illustrating preferred embodiments of the invention by way of example, and wherein:

Figure 1 is a sectional view with parts removed of one embodiment of the invention, the circumscribing spring being omitted, Figure 2 is an end elevation of Figure 1 with the pulley sections removed, Figure 3 is a view similar to Figure 2 with the dogs in expanded position, Figure 4 is an end view of the dogs, one dog being shown in section, Figure 5 is a section taken on line 5—5 of Figure 4, Figure 6 is a view similar to Figure 1 of a modification, Figure 7 is an end view of Figure 6 as seen from the left, and Figures 8 and 9 show the dog sections and manual operator in two different positions.

Referring to the drawing, Figures 1 to 4, there is shown a sleeve or core member 1 of suitable material adapted to receive a driving shaft 2 of a motor, and which is secured to rotate with the shaft by any suitable connection. The sleeve has a plate 4 secured thereto at one end in any suitable manner to rotate therewith. At the other end is secured a flange 5, as by a set screw or the like, this latter flange having a conical face 7 on one side. Another flange 8 with a convex frusto conical face 9 has a bore 11 which receives the sleeve 1, and a spline 12 therein receives the key 13 so that sleeve 1 and flange 8 rotate together, while flange 8 is capable of movement axially of the sleeve. If desired, flange 8 may have an integral sleeve or bearing 14 engaging the sleeve to limit or control wobbling action thereof on the sleeve 1. Flanges 5 and 8 and their convex frusto-conical faces 7, 9 respectively constitute a V groove pulley designated generally by A, adapted to receive an endless V belt B. Pulley section 8 has a concave frusto-conical face 15 opposite face 9.

A centrifugal dog member indicated generally by numeral 18, is composed of two semicircular sections 18a and 18b which provide a conical face 19 disposed at substantially the same apex angle as the face 15 of the pulley section 8. The dog members or wedges 18a, 18b are disposed around sleeve 1 with their flat or normal face 21 adapted to engage abutment 4, and their conical face 19 adapted to engage pulley face 15. The dog has a groove 22 formed in its periphery, and at the ends of each section the groove edges are rounded as indicated at 23. The edge 24 of the dog also is rounded.

The abutment plate 4 carries two pegs 25 and 25' which are located to lie between the dog sections. The pegs are grooved, as indicated at 26, 26' and in assembled position an endless helical spring 27 is located in groove 22 to circumscribe the dog, the spring passing around the pegs 25, 25' to form what may be described as a double kidney shaped loop. The rounded edges 23 of the grooves allow the spring to assume this shape without pinching or binding the spring. The distance of the abutment 4 from pulley section 5, the axial height or thickness of the conical dog 18, and the thickness of pulley section 8 are such, that when the dog sections are at their collapsed or radially innermost position as shown in Figure 1, the distance between pulley sections 5 and 8 is sufficient to prevent driving engagement with the V belt B. In such position the V belt may rest on the sleeve 1.

In operation when a predetermined speed has been attained, the wedges 18a and 18b are driven radially outward by centrifugal force against the centripetal force of spring 27 and due to the wedging action of the dog sections between abutment 4 and face 15, they force the pulley section 8 toward the pulley section 4 to form a driving engagement with the belt. As the depth of the V groove between the pulley sections is substantially greater than the thickness of the V belt, a further increase in speed of the pulley forces the wedges radially outward a further amount and the belt moves radially outward, thus providing a drive on a gradually increasing diameter. The variable ratio drive thus provided tends to accommodate itself to an equilibrium in which the belt tension is proportional to the position of the wedges.

In operation, the spring 27 has an initial bias so as to cause the wedges to stay in their central position. Using a three section wedge, the spring must stretch in expanded position in proportion to the circumference in such position. However, by the provision of only two wedge sections, the spring is required to stretch only in proportion to the difference in diameters. For example, in going from a diameter of 1½ inches collapsed position to 2½ inches expanded position, when two wedges are used, the spring stretches (2½—1½)×2=2 inches. If three wedges were used the spring stretch would be $$\pi 2\tfrac{1}{2} - \pi 1\tfrac{1}{2} = \pi$$

or 3.14 inches. There is thus a one-third reduction in stretch. This greatly reduces fatigue and loss of life in the spring.

The pegs 25, 25' serve as an anchor for the spring to confine the movement of the dog sections so that they tend to keep in symmetrical spaced relation in their spread position, while maintaining a substantially uniformly distributed strain on the spring between anchors. The particular type of anchor employed, which may be called a friction anchor, automatically allows the tension on the spring in the two lobes to be equalized, and thus eliminates manual adjustment or equalization. This anchor also prevents the dogs becoming lodged or struck in expanded position and compels them to return to the proper central position as the speed of the pulley decreases. A number of other beneficial effects are obtained. Because the dog sections are kept in spaced relation in expanded position, the weight is substantially balanced, and vibration is reduced. This also reduces the amount of wobble or nutation of pulley section 8 on sleeve 1 and prolongs the life of the keyed joint therewith.

The combined clutch and variable speed drive device is of particular value on motorcycles, motor bicycles and other small motor propelled conveyances. Some motor bicycles require the motor to be started by pedalling the bicycle, and for such installation I provide a manual engaging clutch device which will now be described. Referring to Figures 6 to 9, the plate 4 has pins 31, 31' rotatably journaled therein and carrying spreaders or cams 33, 34 respectively on their ends. The pins are so located that the cams come between the dog sections 18a and 18b, and when the cams are radially arranged as shown in Figure 8 they allow sufficient collapse of the centrifugal wedges so that there is no driving engagement between the belt and pulley sections. However, when arranged in the angular position as shown in Figure 9, the cams spread the dog sections sufficiently to move pulley section 8 to the right (Figure 6), and thus establish a driving engagement with the belt. In this position when the bicycle is advanced by pedalling, the driven pulley on the bicycle (which now becomes the driving pulley) turns the pulley A to crank the motor.

The spreaders 33, 34 are manually positioned to cause clutch engagement, and I prefer to provide an automatic disengagement thereof with the wedge sections which becomes operative when the motor starts. This feature now will be described. A cap 35 is received over plate 4 and may have turned over edges 36 to retain it in position while allowing rotation of the cap. Pins 31, 31' have arms 37, 38 at their exterior ends and guide pins 39, 41 are located near the outer ends of the arms. These guide pins pass into openings or recesses 43, 44 respectively in the cap 35. These recesses are illustrated as triangular in shape with an apex angle of about 35°.

The operation will now be described. To start the motor, the cap 35 is manually rotated in the direction of the arrow in Figure 7 to shift the arms 37, 38 to approximately a right angle position, as shown by dot and dash lines therein. This turns the spreaders 33, 34 to the position shown in Figure 9 and expands the wedge sections 18a, 18b, so as to shift pulley section 8 to the right and form a driving engagement with the belt. Now upon pedalling the motor bicycle the rear wheel is driven through the coaster brake, which in turn drives pulley A and shaft 2 to turn over and start the motor. When the motor starts the speed of rotation of the pulley develops a force sufficient to immediately restore arms 37, 38 to their radial positions (shown in full lines in Figure 7), and to turn the cap member 35 therewith, so that there is no restraint on the motor. The device then is capable of serving as a variable ratio drive and is in condition to automatically declutch when the motor speed falls below clutching speed.

If desired, the manual clutching device may be remotely operated by means of a wire or other connection with a lost motion connection therewith to allow restoration movement. The manual clutching device may be applied to a clutch having three or more wedges, but for the reasons hereinabove stated, it is preferably used in conjunction with semicircular wedges.

I claim as my invention:

1. A centrifugal clutch comprising: a shaft; a pair of relatively axially movable pulley sections on the shaft providing a V-groove therebetween for reception of a V-belt; a plurality of centrifugal wedge members for relatively shifting said pulley sections; and spreader members located between said wedge members, said spreader members having a normally inoperative position, and being movable to a position wherein they expand the wedge members to shift said pulley sections to belt engaging position.

2. A centrifugal clutch as specified in claim 1 having centrifugally operated means for returning said spreaders to normally inoperative position.

3. A centrifugal clutch as specified in claim 1 wherein said spreader members comprise cams.

4. A centrifugal clutch as specified in claim 1 wherein said spreader members are connected to rotatable arms, and a rotatable cover plate has means engaging said arms for opearting said spreader members.

5. A centrifugal clutch comprising: a shaft; a pair of relatively axially movable pulley sections on the shaft providing a V-groove therebetween for reception of a V-belt; a plurality of centrifugally operated wedge members for relatively shifting said pulley sections toward each other in expanded position; means for positively moving said wedge members to an expanded position; manually operated means for operating said latter means; and centrifugally operated means for moving said manually operated means to inoperative position.

6. A centrifugal clutch comprising: a pair of relatively axially movable pulley sections providing a V-groove therebetween for reception of a V-belt; one of said sections having a concavo-conical cam face; an abutment member having a cooperating cam face opposite said concavo-conical face; a pair only of semi-circular frusto-conical wedge members between said abutment member and a pulley section cooperating therewith and movable outwardly by centrifugal action to move one of said pulley sections toward the other pulley section; a circumscribing spring yieldingly confining said wedge members; and means extending from one of the cam faces to anchor said spring between the wedge members.

7. A centrifugal clutch as specified in claim 6 wherein said anchor means frictionally engage and depress the spring between said wedge members.

8. A centrifugal clutch as specified in claim 7 wherein said wedge members have a peripheral groove to receive said spring, and the ends of said groove are rounded.

9. A centrifugal clutch comprising: a pair of relatively axially movable pulley sections providing a V-groove therebetween for reception of a V-belt; an abutment plate; a plurality of centrifugal wedge members between the abutment plate and one of the pulley sections for relatively shifting said pulley sections; spreader members positioned between adjacent ends of the wedge members in collapsed position of the wedge members, said spreader members having a normal inoperative position, and being movable to an operative position wherein they spread the wedge members to shift said pulley sections to belt engaging position; a rotatable plate mounted on the clutch and means connected between the rotatable plate and the spreader members operated upon rotation of the plate in one direction to move said spreader members to operative position.

10. A centrifugal clutch comprising: a pair of relatively axially movable pulley sections providing a V-groove therebetween for reception of a V-belt; an abutment plate; a plurality of centrifugal wedge members between the abutment plate and one of the pulley sections for relatively shifting said pulley sections; rotatable spreader members positioned between adjacent ends of the wedge members in collapsed position thereof, said spreader members having a normal inoperative position, and being movable to a position wherein they spread the wedge members to shift said pulley sections to belt engaging position; a rotatable plate; and arms secured to said spreader members and rotatable therewith, said arms having a lost motion interengagement with said plate and operative upon rotation of the plate in one direction to shift said spreaders to wedge expanding position, and develop a force to return the spreader members to inoperative position upon rotation of the pulley sections in one direction.

11. A centrifugal clutch as specified in claim 10 wherein said rotatable plate has a flange engaging said abutment retaining the plate against separation from said abutment.

12. A device of the class described comprising: a shaft; a first pulley section secured to the shaft providing a conical belt-engaging face; an axially floating pulley section having a cam face mounted on the shaft to rotate therewith and providing a complementary conical belt-engaging face forming a V-groove with the first pulley section adapted to receive a V-belt, said V-groove having a depth greater than the thickness of the V-belt; an abutment plate on said shaft adjacent said floating pulley section having an opposing cam face, the opposing cam faces of the pulley and abutment converging radially outward; a pair only of radially movable wedge-shaped segments normally located in radially inward position about the shaft to allow said pulley sections to disengage from the V-belt; said segments having outwardly converging opposite cam faces, and upon rotation of said shaft above a predetermined speed, being guided by the cam faces of the floating pulley and abutment in moving radially outwardly to maintain simultaneous wedging engagement with the abutment cam face and pulley cam face to move said belt-engaging faces of the pulley sections in driving contact with the V-belt; the maximum axial distance between the opposite cam faces of a wedge segment measured at any given radius when the segments are at their normally radially inward position being less than the axial distance between the pulley cam face and abutment cam face measured at the same given radius when the floating pulley sections is disengaged from the belt; and means forming a driving engagement between said segments and shaft to rotate the segments while the cam faces of the segments are in said radially inward position.

13. A centrifugal clutch comprising: a shaft; a pair of relatively axially movable pulley sections on the shaft providing a V-groove between the pulley sections, one of said sections providing a tapering cam face; an abutment on said shaft opposing said cam face; a pair only of tapered wedge members located between the abutment and one pulley section to engage the cam face and abutment, said wedge members being radially movable relative to said shaft and circumferentially movable relative to each other and to the shaft; and a circumscribing spring yieldably confining said wedge members about said shaft.

14. A centrifugal clutch as specified in claim 13 having means on said abutment engaging said spring between wedge members.

MARION H. DAVIS.

REFERENCES CITED

The following references are of record in the file of this patent:

UNITED STATES PATENTS

| Number | Name | Date |
| --- | --- | --- |
| 1,077,728 | Mann | Nov. 4, 1913 |
| 1,215,513 | Fichter | Feb. 13, 1917 |
| 2,065,432 | Delay | Dec. 22, 1936 |
| 2,104,074 | Erbach | Jan. 4, 1938 |
| 2,180,217 | Thomas | Nov. 14, 1939 |
| 2,251,588 | Gilbert | Aug. 5, 1941 |
| 2,453,580 | Lusk | Nov. 9, 1948 |
| 2,496,061 | Miner | Jan. 31, 1950 |
| 2,496,201 | Dodge | Jan. 31, 1950 |